United States Patent Office 3,413,490
Patented Nov. 26, 1968

3,413,490
CIRCUIT ARRANGEMENT FOR SUPPRESSING OUTPUT PULSES IN CONVERTING MEASURING VALUES WITH THE AID OF A VOLTAGE-FREQUENCY CONVERTER
Hans Breunig, Karlsruhe-Hagsfeld, and Hans Kurner, Karlsruhe, Germany, assignors to Siemens Aktiengesellschaft, Munich, Germany, a corporation of Germany
Filed Jan. 21, 1964, Ser. No. 339,129
Claims priority, application Germany, Jan. 28, 1963,
S 83,453
4 Claims. (Cl. 307—233)

The invention disclosed herein is concerned with a circuit arrangement for the conversion of measuring values, employing a voltage-frequency converter at the output terminals of which are provided means for suppressing output impulses when the frequency of the impulse signal reaches a given value.

Voltage-frequency converters or translators are known and employed in the measuring or instrumentation art for the analog-digital conversion. The problem involved in connection with such an arrangement resides in the requirement for accurate linearity, that is, at a measuring value zero, there also must be delivered the frequency zero at the output side of the converter. Upon connecting such voltage-frequency converter to an amplifier and measurement converter, there must also be considered the null point error so as to avoid that the converters deliver impulses at the measuring value zero.

The object of the invention is to provide a simple circuit arrangement which contributes toward a solution of the above indicated problem and which enables a narrowing of the measuring range, for example, in the sense of a null point suppression.

These objects of the invention are realized by the provision of means, at the output terminals of the voltage-frequency converter, which effect the suppression of output impulses as soon as the frequency of the impulse signal reaches a definite value.

The various objects and features of the invention will appear from the appended claims and from the description of embodiments thereof which is rendered below with reference to the accompanying drawings.

Figure 1:
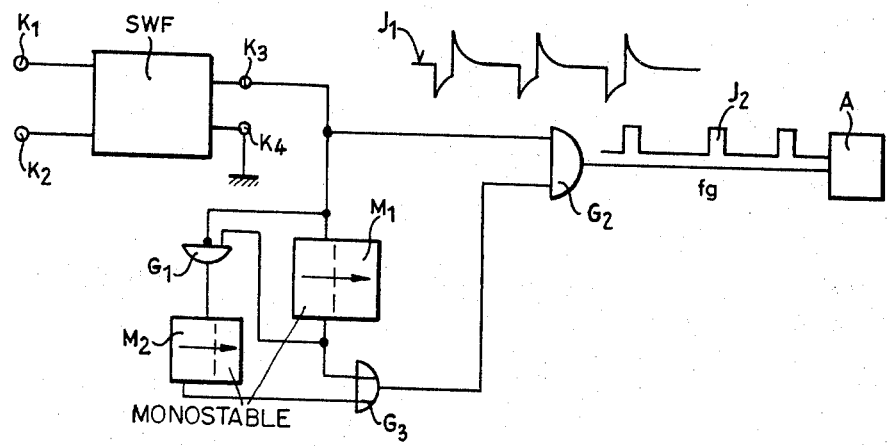
Figure 2:
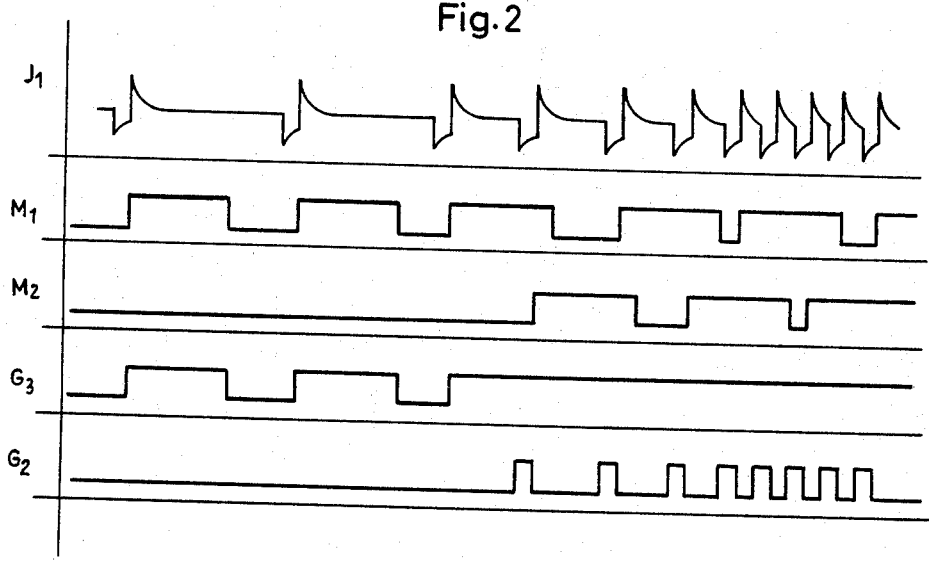
Figure 3:
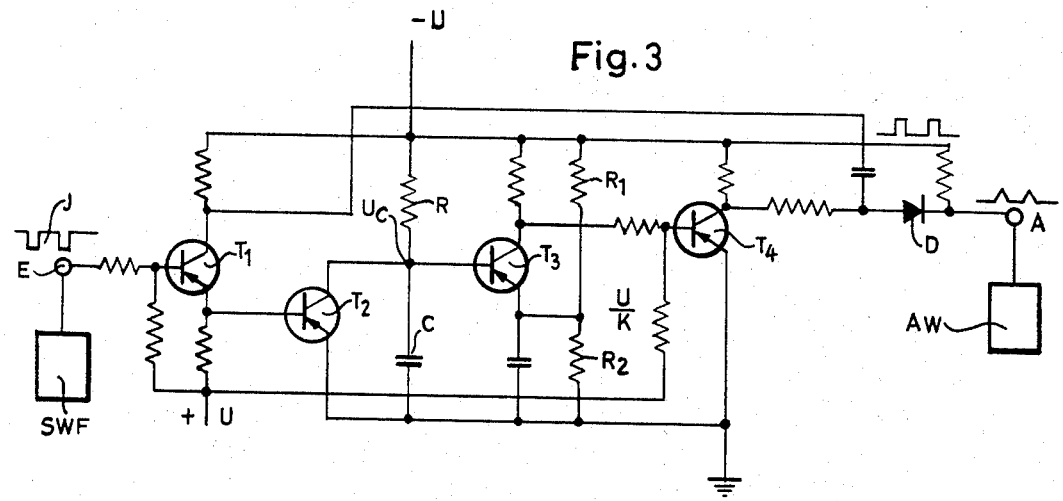
Figure 4:
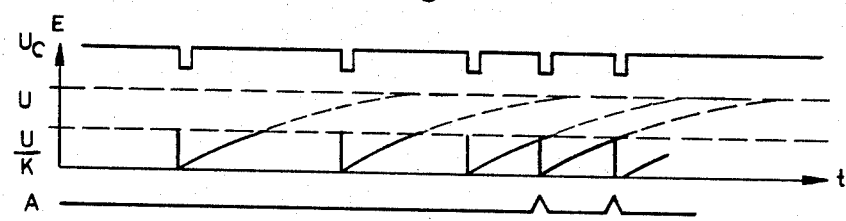
Figure 5:
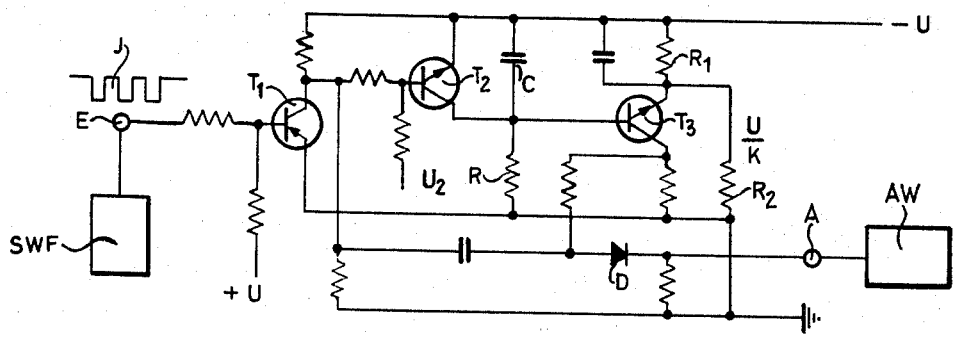

FIG. 1 shows in block diagram manner a circuit arrangement for the null point suppression;
FIG. 2 is an impulse diagram;
FIG. 3 represents an embodiment according to the invention employing four pnp-transistors;
FIG. 4 is a diagram illustrating the charging of a capacitor included in the arrangement according to FIG. 3; and
FIG. 5 shows another embodiment of the invention.

Referring now to FIG. 1, the measuring voltage is by way of the terminals K1, K2 conducted to the voltage-frequency converter SWF at the output terminals K3, K4 of which is given off an impulse signal J1 with a frequency which is proportional to the value of the measuring voltage. The impulse signal J1 is conducted to the input of an And-gate G2 and to the input of a mono-stable flip-flop stage M1 which responds operatively to the negative impulse flanks. The And-gate G2 is constructed so that it responds operatively to the negative impulse flank of the impulse signal J1. The input and the output of the mono-stable flip-flop stage M1 are connected with the inputs of an And-gate G1. A further mono-stable flip-flop stage M2 is operatively triggered from the output of the And-gate G1. The outputs of the mono-stable flip-flop stages M1 and M2 are connected with inputs of the Or-gate G3, the output of the latter controlling a second input of the And-gate G2. The output of the And-gate G2 is connected with an evaluation device A, for example, a digital indicating device or the like, to which is conducted the impulse signal J2.

The operation of the circuit arrangement is as follows:
The time constant of the mono-stable flip-flop stage M1 is adjusted so that it corresponds to the temporal spacing of impulses of the signal J1, below the frequency of which is to be effected a suppression of the signal delivery. The mono-stable flip-flop stage M2 accordingly receives an impulse from the output of the And-gate G1 only when the mono-stable flip-flop stage M1 is upon receipt of the next impulse from the output terminals K3, K4 of the voltage-frequency converter SWF, already in flipped condition. The gate G3 gives off a prolonged impulse at its output only responsive to the operative control of the flip-flop stage M2. The gate G2 is thereby likewise triggered, in the interval in which the impulses of the impulse signal J1 are delivered, that is, it becomes conductive respectively only for impulses above a definite impulse sequence frequency.

The cooperation of the flip-flop stages M1 and M2 with the gates G2 and G3 is apparent from FIG. 2, which represents conditions in the presence of an impulse signal with increasing frequency. When the temporal spacing of the impulses of the impulse signal J1 reaches a given value, there will be triggered the mono-stable flip-flop stage M2, with the effect that the output of the Or-gate G3 is likewise activated at the instants in which the impulses of the signal J1 are extended to the input of the gate G2.

It will accordingly be seen that there is provided a mono-stable flip-flop stage (M1) to which are conducted the output impulses from the voltage-frequency converter (SWF), which flip-flop stage (M1) controls a coincidence circuit in such a manner that all impulses are suppressed the temporal spacing of which is greater than the time constant of the flip-flop circuit (M1). More in detail, and as described above, the circuit arrangement comprises two mono-stable flip-flop circuits (M1 and M2), one of such flip-flop circuits (M1) being triggered from the output terminals of the voltage-frequency converter directly and the other (M2) by way of a first And-gate (G1), the second input of the first And-gate (G1) being connected with the output of the first mentioned mono-stable flip-flop stage (M1), and the outputs of both mono-stable flip-flop stages (M1 and M2) being joined by way of an Or-gate (G3) for controlling a second And-gate (G2) over which the output impulses of the voltage-frequency converter (SWF) are conducted to the evaluation device (A).

The invention provides a modified circuit arrangement which is intended to simplify the arrangement described above with reference to FIGS. 1 and 2.

The advantage of the modified arrangement resides in that it requires only few structural components and that it is largely independent of fluctuations of the temperature and the magnitude of the operating voltage.

The modified circuit arrangement according to the invention provides a transistor which is made conductive by the output impulses of the voltage-frequency converter, such transistor having a capacitor connected to the output circuit thereof which capacitor is by the operating voltage charged over a resistor so that a successive transistor is made conductive only when the charge voltage exceeds after a certain time a given value, thereby causing a switching device to prevent the transmission of the impulses to an evaluation device.

In one modified circuit arrangement according to the invention, the capacitor is disposed in the base circuit of the transistor, the emitter electrode of which is connected to a voltage divider having a tap which determines the magnitude of the blocking or barrier voltage.

Another modified arrangement comprises a diode which prevents the transmission of the impulses of the voltage-frequency converter to an evaluation device, responsive to a blocking or barrier voltage conducted thereto, which voltage is produced either directly by the transistor having in its base circuit the capacitor referred to or with the aid of a further transistor disposed in the circuit.

The modified embodiments will now be described more in detail with reference to FIGS. 3 to 5.

FIG. 3 shows as an example an embodiment comprising four pnp-transistors. To the input E of the circuit arrangement are conducted negative impulses J from the voltage-frequency converter SWF, such impulses being on the one hand extended from the collector of the transistor T1 by way of the blocking diode D to an evaluation device AW which is connected to the output terminal A, and on the other hand from the emitter circuit to the transistor T2. A capacitor C is disposed in the collector circuit of the transistor T2 and in the base circuit of the transistor T3, respectively, such capacitor being charged by the operating voltage by way of the resistor R. Each impulse J makes the transistor T2 conductive and causes the capacitor C to discharge. The transistor T3 is blocked in the discharge condition of the capacitor C. The blocking condition of the transistor T3 is effective to make the transistor T4 conductive. The diode D thus receives a voltage which causes it to become conductive and the impulses J are transmitted from the input E to the output A.

The capacitor C is at low impulse frequency, up to the receipt of the next impulse. charged to a voltage which exceeds the value $U/K$ (see FIG. 4). The transistor T3 accordingly becomes conductive and blocks the transistor T4, thus causing the diode D to become blocked. When the voltage across the charged condenser C drops to the value $U/K$ due to an increase of the pulse frequency, the diode is fed with a voltage sufficient to make it conductive.

The residual collector-base currents of the transistors T2 and T3, which flow in the R–C circuit, shall advantageously cancel one another. The temperature dependent alterations of the residual collector current of the transistor T2 and the base-emitter voltage of the transistor T3 are likewise subtractive, so that the circuit operates in very stable manner even in the presence of temperature fluctuations.

The embodiment of the invention shown in FIG. 5 is simplified by the use of npn-transistors in the transistor stages T2 and T3. The transistor T3 delivers the blocking voltage for the diode D directly from its collector circuit. However, the operation of the circuit arrangement corresponds to that of the arrangement according to FIG. 3.

Changes may be made within the scope and spirit of the appended claims which define what is believed to be new and desired to have protected by Letters Patent.

We claim:

1. A frequency-responsive impulse-conduction circuit operative to effect a suppression of such impulses when the frequency of such impulses attains a given value, comprising input terminal means at which the impulses to be controlled are received, output terminal means at which signals, of the same frequency as the input impulses, are to be available, circuit means operatively connecting the input and output terminal means for conducting impulses from the input to the output terminal means, impulse-suppressing means interposed in said circuit means for selectively suppressing the passage of impulses to said output terminal means, and means operatively connected to said circuit means for energizing said suppressing means to suppress the delivery of impulses to the output terminal means when the frequency of the input impulses attains said given value, wherein said circuit means comprises a mono-stable flip-flop stage operating with a given time constant, to which the impulses appearing at said input terminal means are conducted, said suppressing means comprising a coincidence circuit controlled by said impulses for suppressing all the impulses the temporal spacing of which is greater than the time constant of said flip-flop stage.

2. A frequency-responsive impulse-conduction circuit operative to effect a suppression of such impulses when the frequency of such impulses attains a given value, comprising input terminal means at which the impulses to be controlled are received, output terminal means at which signals, of the same frequency as the input impulses, are to be available, circuit means operatively connecting the input and output terminal means for conducting impulses from the input to the output terminal means, impulse-suppressing means interposed in said circuit means for selectively suppressing the passage of impulses to said output terminal means, and means operatively connected to said circuit means for energizing said suppressing means to suppress the delivery of impulses to the output terminal means when the frequency of the input impulses attains said given value, wherein said circuit means comprises a first and a second monostable flip-flop stage, a first And-gate, a first input of said first And-gate, and an input of said first flip-flop stage being connected to said input terminal means, an output of said first And-gate being connected to an input of said second flip-flop stage, an output of said first flip-flop stage being connected to a second input of said first And-gate, an Or-gate, means for connecting the outputs of said flip-flop stages with said Or-gate, said suppressing means comprising a second And-gate controlled by said Or-gate and said second And-gate being operative to extend impulses to said output terminal means corresponding to those received at said input terminal means.

3. A frequency-responsive impulse-conduction circuit operative to effect a suppression of such impulses when the frequency of such impulses attains a given value, comprising input terminal means at which the impulses to be controlled are received, output terminal means at which signals, of the same frequency as the input impulses, are to be available, circuit means operatively connecting the input and output terminal means for conducting impulses from the input to the output terminal means, impulse-suppressing means interposed in said circuit means for selectively suppressing the passage of impulses to said output terminal means, and means operatively connected to said circuit means for energizing said suppressing means to suppress the delivery of impulses to the output terminal means when the frequency of the input impulses attain said given value, wherein said circuit means comprises a first transistor which is made conductive by the action of the impulses appearing at said input terminal means, said suppressing means comprising a switching device for controlling the transmission of said impulses to said output terminal means, a second transistor having a base thereof connected with a collector of the first transistor, a capacitor connected in an output circuit of said first transistor, and a resistor for charging said capacitor by an operating voltage, the second transistor becoming conductive only when the charge voltage exceeds after a given time a definite value $U/K$, whereby said switching device becomes operative to suppress the transmission of impulses to said output terminal means, means forming a voltage divider, said capacitor being connected with the base of said second transistor, an emitter electrode of said second transistor being connected with the voltage divider having a tap which determines the magnitude of said value $U/K$, and a diode which forms said switching device, said diode becoming operative responsive to receipt of a voltage which is directly produced by said second transistor.

4. A frequency-responsive impulse-conduction circuit operative to effect a suppression of such impulses when the frequency of such impulses attains a given value, comprising input terminal means at which the impulses to be controlled are received, output terminal means at which signals, of the same frequency as the input impulses, are to be available, circuit means operatively connecting the input and output terminal means for conducting impulses from the input to the output terminal means, impulse-suppressing means interposed in said circuit means for selectively suppressing the passage of impulses to said output terminal means, and means operatively connected to said circuit means for energizing said suppressing means to suppress the delivery of impulses to the output terminal means when the frequency of the input impulses attains said given value, wherein said circuit means comprises a first transistor which is made conductive by the action of the impulses appearing at said input terminal means, said suppressing means comprising a switching device for controlling the transmission of said impulses to said output terminal means, a second transistor having a base thereof connected with a collector of the first transistor, a capacitor connected in an output circuit of said first transistor, and a resistor for charging said capacitor by an operating voltage, the second transistor becoming conductive only when the charge voltage exceeds after a given time a definite $U/K$, whereby said switching device becomes operative to suppress the transmission of impulses to said output terminal means, means forming a voltage divider, said capacitor being connected with the base of said second transistor, an emitter electrode of said second transistor being connected with the voltage divider having a tap which determines the magnitude of said value $U/K$, a diode which forms said switching device, a further transistor connected with said second transistor, said diode becoming operative responsive to the receipt of a voltage which is produced by the cooperation of said further transistor with said second transistor.

References Cited

UNITED STATES PATENTS

| | | | |
|---|---|---|---|
| 2,541,038 | 2/1951 | Cleeton | 328—109 |
| 2,576,075 | 12/1951 | Smith | 328—109 |
| 3,146,432 | 8/1964 | Johnson | 328—138 |
| 3,184,606 | 5/1965 | Ovenden et al. | 307—88.5 |

ARTHUR GAUSS, *Primary Examiner.*

J. ZAZWORSKY, *Assistant Examiner.*